US006641051B1

(12) United States Patent
Illowsky et al.

(10) Patent No.: US 6,641,051 B1
(45) Date of Patent: Nov. 4, 2003

(54) SYSTEM FOR EMBEDDED DIGITAL DATA THAT ALLOWS EMBEDDING OF DATA AROUND KNOWN OBSTRUCTIONS

(75) Inventors: Daniel H. Illowsky, Cupertino, CA (US); Dan S. Bloomberg, Palo Alto, CA (US); Robert E. Weltman, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/404,755

(22) Filed: Sep. 24, 1999

(51) Int. Cl.[7] .................................... G06K 19/06

(52) U.S. Cl. ...................... 235/494; 235/456; 235/487

(58) Field of Search ............................ 235/454, 487, 235/494, 462.12, 437; 382/232

(56) References Cited

U.S. PATENT DOCUMENTS

| | | | | | |
|---|---|---|---|---|---|
| 5,424,526 | A | * | 6/1995 | Leonhardt et al. | 235/454 |
| 5,449,895 | A | * | 9/1995 | Hecht et al. | 235/456 |
| 5,521,372 | A | * | 5/1996 | Hecht et al. | 235/454 |
| 5,541,396 | A | * | 7/1996 | Rentsch | 235/454 |
| 5,761,686 | A | * | 6/1998 | Bloomberg | 382/232 |
| 6,035,055 | A | * | 3/2000 | Wang et al. | 382/118 |
| 6,278,791 | B1 | * | 8/2001 | Honsinger et al. | 382/100 |

* cited by examiner

*Primary Examiner*—Michael G. Lee
*Assistant Examiner*—Ahshik Kim

(57) ABSTRACT

A system for printing glyph frames around known obstructions. All frames in an area are determined to be obstructed or unobstructed, based on their location with respect to other printed areas. The unobstructed locations can be numbered and glyph data printed within. In the alternative, the good locations can be numbered modulo some number much smaller that the number of available locations to provide redundancy. The unobstructed locations can be stored in either the sync lines or in the data area of other locations known to be unobstructed. Also, the frame itself can be identified as obstructed or unobstructed to provide more redundancy.

9 Claims, No Drawings

SYSTEM FOR EMBEDDED DIGITAL DATA THAT ALLOWS EMBEDDING OF DATA AROUND KNOWN OBSTRUCTIONS

BACKGROUND OF THE INVENTION

A method of using glyphs on a page in a way that will avoid obstructions such as printed characters by providing one frame of data glyphs with instructions that will specify whether other specific frames are either valid or not valid.

A glyph is a diagonal line printed on paper that slopes at one angle to indicate one state of a bit, and at a different angle to indicate the other state. A frame of information is in numerical or word form, and there is no intended image. Glyphs are small, typically 1/60$^{th}$ of an inch and a printed 10 by 10 glyph frame, including its sync lines, appears as a gray square.

Numerous patents have issued on the generation and use of glyphs, such as U.S. Pat. No. 5,245,165, Self-Clocking Glyph Code for Encoding Dual Bit Digital Values Robustly; U.S. Pat. No. 5,449,895, Explicit Synchronization for Self-Clocking Glyph Codes; and U.S. Pat. No. 5,521,372, Framing Codes for Robust Synchronization and Addressing of Self-Clocking Glyph Codes, which are incorporated by reference herein.

A problem with an area of glyphs is that there may be overwritten characters, destroying the underlying glyphs. Of course, if a frame is completely destroyed, it can not be read and it will be disregarded by the system. In case a frame is in a position where it may be partially destroyed, the sync lines of that frame can contain information to tell the reader to disregard the frame even if it appears to be readable. The problem with this system is that the sync lines of a frame must be read before it can be determined whether it is valid. Thus, there is a need for a system where it may be determined beforehand if a frame may be obstructed.

SUMMARY OF THE INVENTION

When printing a page where there are known areas where the glyphs may be obstructed, one or more frame may be given the task of identifying the other frames in the area that may be obstructed, or those that are known not to be in areas of obstruction.

A frame is identified by one or more sync, or lattice, lines, and contains a block of data bits. If one or more of the frames is assigned the role of using its data, bits to store data identifying valid frames, then the other, possibly invalid, glyphs can be safely ignored. This information can be in the form of coordinates of a rectangle within which good (or bad) glyphs are printed, or for more complex shapes, a bit map can be used.

DETAILED DESCRIPTION OF THE INVENTION

A number of inventions that allow embedded digital data to be written around known obstructions, in such a way that readback is effected with high tolerance for either random or localized image destruction, and without a priori knowledge of the obstructions, are described herein. These allow an application to embed the data as, for example, a background stipple around some printed marks (e.g., a company logo or a form title), and to recover the data by scanning, using a reader that has no information about the marks other than that which can be determined from the scanned image itself.

The module that starts with the input data and lays the glyphs out as an image (or as something that can be directly converted to an image) is called the "writer". The module that recovers the original data by analyzing the image is called the "reader". The writer knows about the obstructions and defines valid and invalid regions. The data is written into the valid regions, and replicated into the invalid regions. This information (valid/invalid regions) is communicated to the reader using a bootstrapping sequence, that employs some or all of the following elements:

(1) data within the sync frame lines (2) a Key Codeword of data (either fixed or variable length)

(3) data extensions to the Key Codeword

The Key Codeword and its use for encoding digital data around known obstructions is the primary feature of this invention. Use of a Key Codeword of data, when properly dispersed and protected by parity, is a robust method for acquiring meta information that is required by the reader for decoding the actual data.

Described herein are different types of data that one may wish to encode within the Key Codeword, the method by which the Key Codeword is dispersed for protection against local damage, methods for extending the size of the Key Codeword, some methods for encoding the valid/invalid regions (including by frame and by variable granularity), and the replication of valid data into invalid frames. We also give a detailed example of an extensible 4-bit encoding for valid/invalid regions of variable granularity. The ability to vary the granularity within an encoding both gives the encoding the flexibility to write glyphs around an arbitrary foreground logo and allows the encoding of the valid/invalid data itself to be efficient.

Definitions and System Overview

This section defines the terminology used throughout, and also gives a broad and simple overview of the encoding and decoding processes.

Terminology

Edd: embedded digital data, a generic term that is also used to represent the set of marks in a particular instance.

Glyphs: the popular name for embedded digital data. "Glyph" is sometimes used to mean a single (1-bit) mark, and sometimes to refer to the entire set of such marks.

Frame: an m×n bit rectangular region containing data glyphs and sync lines.

Sync data: glyphs that are not data (and are not encoded) but are used to find the location and ordering of the glyphs.

Sync line: a line of sync (and possibly other) data.

Sync lattice: the lattice of sync lines. This is typically a rectangular lattice, where each frame of data is bounded on four sides by sync lines. Thus, this is a lattice of glyphs into which the glyph data is "poured".

Sync crossing: the location where two sync lines cross. These are special reference points in the sync lattice.

Meta-data: glyphs that are used to describe how the glyph data is written. This may include encoding parameters (block size, parity bytes, crc bytes) as well as marking valid and invalid data frames.

V/IV: valid/invalid regions.

Logo: name given to foreground image data (e.g., text, graphics)that is superimposed (overlaid, underlaid) on the digital data. These marks cause the problem that is the subject of this IP.

Damaged frame: data frames containing sufficient logo to cause the writer to decide to invalidate the frame.

Ecc: error correction coding—the addition of parity bits to the data in order to identify and correct errors.

Parity: another name for the symbols added to the data to allow errors to be identified and corrected.

Erasures: symbols identified (e.g., by a weak signal) as being unreliable to read, and therefore designated specifically to be corrected using the parity symbols.

Symbol: for Reed Solomon block codes, the symbol is typically taken to be 8 bits. Damage to any number of bits within a symbol can be corrected with two symbols of parity (or one symbol if the damaged symbol can be identified as an "erasure".)

Bit: each 45-degree glyph encodes, through its orientation, a bit of information, because we interpret the value of the glyph as 0 or 1 depending on the orientation. Hence, we often use "bit" interchangeably with "glyph".

Data: the information from the user's application that is actually encoded by the glyphs.

Key Codeword: a special set of glyphs that contain meta-data

Extended Codeword: an optional special set of glyphs that contain meta-data that cannot be fit into the Key Codeword.

Overview of the Encoding/Decoding Process

The following description of the encoding and decoding process is included to give an overview of the critical elements of the process.

General Flow of Encoding

1. Allocate an EncoderData structure with a copy of the data to be encoded.
2. Allow parameters to be set in the structure for glyph size, layout, etc.
3. Just before encoding, calculate the required number and layout of frames to fit the data, meet the size requests, and provide sufficient parity. To do this, it is necessary to check all potential frames to see which ones are obscured, and to create a bitmap of good/bad frames. The size of all codewords except for the Key Codeword is calculated in such a way as to most efficiently use the space available, using free space for additional parity if possible. This information is put into the Key Codeword, which has a fixed part (containing the number of real data bytes, the codeword length and the number of parity bytes per codeword) plus a variable part (the good/bad bitmap).
4. Add CRC to each codeword.
5. Add the parity to each codeword.
6. XOR each byte of data, parity and CRC with a known constant.
7. Reorder the data stream using a pseudo-random sequence that is based on the total number of good frames times the number of bytes per frame.
8. Layout the edd. The steps are:
   a. generate a synch lattice into an image
   b. generate the data glyphs, frame by frame, into the image. Fold the bytes into two vertically adjacent nibbles. For bad frames (i.e., those that contain logo or text), repeat the previous frame's data.
   c. Any frames at-the end of the edd block that are unfilled are filled by repeating frames from the beginning.
9. OR the image with the input image, if any, to place the logo over the constructed edd image. Damage from this step should only occur in bad frames.

General Flow of Decoding

1. Find the bounding box of the glyph region.
2. Find the glyph size (if not explicitly provided).
3. Find the corners of the glyph region.
4. Estimate the number of synch frames, and the location of the synch crossings.
5. Search around the expected locations for crossings; interpolate unfound crossings.
6. Extract the data in the top row of frames, frame by frame, unfolding the bytes.
7. Reorder the data pseudo-randomly, based on the number of bytes. XOR with constant.
8. Decode, check CRC, and interpret the Key Codeword to generate a map of all synch frames, and to find the size and number of remaining codewords.
9. Use the map to extract data from the remaining synch frames, unfolding the bytes. Keep track of erasures (bytes that couldn't be read unambiguously).
10. Pseudo-randomly, reorder the data based on the number of bytes.
11. XOR with the constant.
12. For each codeword, correct erasures falling within it; then correct remaining errors using Berlekamp-Massey.
13. Check the CRC of each codeword.
14. Extract and concatenate the decoded data, and return it as an allocated array.

BACKGROUND

For many applications, there is a significant advantage to intercalate digital data around printed marks, rather than to simply apply the digital data to a blank region of a page.

(1) Use with pre-existing forrns. A customer may have a set of forms whose layout serves a particular set of functions and cannot easily be changed. There may not be significant blank regions on the form for the exclusive use of digital data.

(2) Digital data that overlays printed material, when applied at sufficiently high density (less than 20 mils on center) is perceived as a uniform gray stipple behind the foreground figure (text, drawing) that only serves a decorative function. Thus, with the addition of digital data, the aesthetics of the form are preserved (or enhanced).

The simple way to handle this situation is for the writer to pretend that there is no foreground of printed marks, and to apply sufficient error correction so that the foreground marks can be treated as damage (along with some additional damage that can occur between the time the glyphs are rendered onto paper and re-scanned in as a pixel map). This approach is often feasable, but can result in an extremely inefficient system where much of the data is parity (error-correction) and a significant amount of computation is required to correct the errors. [With a Reed-Solomon block ecc, this approach will work in situations where the fraction of damaged symbols, where a symbol is a grouping of 8 glyph bits, is significantly less than the fraction of ec parity symbols that are added, under the assumption that we can detect such damaged symbols and correctly label them as "erasures" for the decoder.]

Another approach is for the writer to write data only in regions that are unobstructed, and to communicate this information to the reader through an external channel (i.e., external to the scanned image). This is practical when there is only a single configuration of obstruction (e.g., a single form), and the reader can obtain this information before reading the scanned image.

For the typical (and general) situation, neither of these approaches is practical. The writer is required to communicate meta-data—information about the encoding and the regions of valid data to the reader—through the image itself. The engineering problem is to find methods that are both efficient (e.g., low glyph overhead for the meta-data) and robust to damage, and particularly to localized damage.

Implementation

In order to carry out the task described above, the invalid regions must be labelled by the writer in such a way as to be recoverable by the reader. This information must be obtained by the reader before any further decoding can be done. Consequently, the process of discovery by the reader must be staged. We will examine two different approaches. In the first, the V/IV regions will be identified by data embedded in the sync lattice. In the second, a bootstrap process is used, whereby the meta-information about V/IV regions is held in a block (or a set of blocks) of data at known or computable locations.

First, however, we consider decisions about granularity of V/IV regions and frame size.

Granularity of V/IV Regions

There are several choices for the granularity of these regions:

(1) By frame. In this choice, all glyph symbols in a frame are either valid data or not.

(2) By encoded symbol. In this choice, the granularity is the symbol of the encoded glyphs, which is typically 8 glyphs. For best immunity against local damage, the symbol should be folded, say as 4×2.

(3) By arbitrary regions. Rectangles are the most simple (compact) to describe.

The method of identification of V/IV regions depends on the granularity. We will primarily consider case (1), where the granularity of V/IV data segment is the frame itself. A more general approach is given below.

The most simple situation is where the data is organized into frames, the frames are placed down on a rectangular lattice, and are marked in some way to indicate whether or not the data within the frame is valid. The writer makes the determination of frame validity based on the amount of foreground (text, graphics) that is overlaid on the digital data. The reader must be able to reconstruct the actual data, in the exact order written, based on this meta data Although not required, we will assume that the frames are contained within a sync lattice of lines of sync data. Depending on the size of each frame, the sync lattice may be able to hold meta-data about the valid frames.

How Big Should the Frames be? Here are Some Considerations (1) For small frames, the sync lattice alone constitutes a large overhead. For n×n frames, the fractional overhead is approximately 2/(n+1). For example, for 8×8 frames, the tiling size including the sync lattice is 9×9, so the overhead is (81−64)/64=22%.

(2) For large frames, image distortion and loss of sync crossings makes it more difficult to locate glyph centers from sync crossings.

(3) Where glyphs are overlaid on logo, small frames are preferable because the net loss due to damaged frames decreases with frame size.

An answer to the question above is: frames should be as big as possible so as to minimize the net loss due to damaged frames plus sync overhead, and at the same time they should be small enough to ensure sync recovery and location of the glyphs within valid frames.

Meta-Data Frame V/IV Information Within the Sync Lattice

The most important information from the sync lattice is the location of the sync line crossings, because from these locations it is straightforward to determine the location of the glyph centers within the frames. To be useful, at least 8 glyphs should be used in the sync lattice to mark each sync crossing, because this gives a false crossing rate of about 0.4%, which is tolerable. A reasonable choice for the sync crossing is to use 5 horizontal and 5 vertical glyphs (9 in total). For frames with n=8, this gives 4 data bits in the sync lattice on each side of each frame that are not used for sync. These bits can be used to label the glyph frames. Here is an example of this case:

```
  1         1
  0         0
1 0 1 0 1 x x x x 1 0 1 0 1 x x
  0         0
  1         1
  x         x
  x         x
  x         x
  x         x
  1         1
  0         0
1 0 1 0 1 x x x x 1 0 1 0 1 x x
  0         0
  1         1
```

where the "x" are bits between the sync bits that can be used to carry auxiliary information.

There are several choices for how the V/IV information is carried in these bits. The following information can be used:

(1) A bordering frame is V/IV.

(2) A distant frame is V/IV. If local damage destroys an entire frame, it would be useful to have non-local confirmation on its V/IV status.

(3) The "address" of a valid bordering frame.

Two points should be noted. First, the address can give the actual valid frame number (e.g., the 29th valid frame), or it can give just a set of least significant bits of this number (e.g., with 3 address bits, it would be 29 mod 8=5).

Second, for robust systems it is very important to recover the numbering information in order to decode the message. A good method for ensuring successful decoding in the presence of significant local damage is to distribute the symbols (8-glyph entities) throughout the entire pattern. For data recovery, most of the valid frames need to be found and to have the correct sequence number, because the symbols will be taken in a fairly random way from all of them. Decoding should be possible if individual valid frames are unreadable, and even if their validity cannot be determined. As long as we recover the correct sequence number of most valid frames, correct decoding will be possible. This is similar to the reason that ethernet packets are numbered. In that case, lost packets can be re-sent. For our case, the data in lost frames can be regenerated using (a) redundant writing or (b) parity bits, where all missing symbols are treated as erasures.

Use of Key Codeword(s) for Identifying V/IV Frames

An alternative to using glyphs within the sync lattice to identify V/IV frames is to have a special codeword, called a Key Codeword, that carries this information. This is described in detail in the following subsections.

General Properties

The Key Codeword is the first and most critical step in the bootstrapping process. In addition to identifying V/IV frames, it would typically contain the encoding method (e.g., block size and number of parity symbols) and the number of data bytes. Reliability in extracting the Key Codeword must be assured; if it cannot be reconstructed, subsequent steps in decoding will, in general, not succeed.

For maximum reliability and flexibility, the Key Codeword should have the following properties:

(1) It should not reside in one location. Ideally, it should be distributed throughout the entire edd, in the same way as the actual encoded data.

(2) It must have its own error correction parity symbols. Because of its importance, it would be advantageous to apply any other redundancy that is essentially free.

(3) It must be reconstructable by the reader without any a priori knowledge about this particular instance.

(4) It should provide an extensible language for presenting the data that it contains.

Dispersal of the Key Codeword

For maximum protection against local damage, the Key Codeword should be dispersed throughout the edd. However, this is difficult because we have a circular problem. The Key Codeword, or Extended Codewords, contain information about V/IV frames, but it is necessary to know which frames are valid in order to read the Key Codeword itself.

Another method would be to disperse the Key Codeword redundantly within the sync lattice. This is fairly complicated and would be dangerous in situations where the total amount of data to be held in the edd is small, because there would be relatively little sync lattice in which to hold the Key Codeword. In situations where there are a large number of non-sync bits within the sync lattic that can be used to hold the Key Codeword, this may be feasible.

A head-on approach to the problem of general dispersal of the Key Codeword is given below. Here, we give a simple method that we have implemented, and which finesses the general problem.

We assume the existence of a sync lattice, and that the sync information within this lattice can be used to identify the sync lattice and the embedded frames. Thus, the number and size of the frames can be determined by the reader without any information from the Key Codeword.

We arrange that the edd always has a subset of frames that is known, a priori, to be valid, and we embed the Key Codeword within this subset of frames within the laid-out edd. For example, the exterior ring of frames in the edd could be constrained to be all valid, and the Key Codeword could be placed within these frames in a manner computable from the number and size of frames. This constraint, of having a set of valid frames in computable locations, is not very limiting on the format of the edd. With this constraint, the Key Codeword should have a larger fraction of parity bytes than the data, because (1) there is typically only a small amount of data in the Key Codeword and (2) the Key Codeword has a more restricted spatial distribution than the data, which is distributed throughout the entire edd.

Size Extensibility of the Key Codeword

For general extensibility, each property described in the Key Codeword can be tagged with a few bits (glyphs). Further, with respect to the size of the Key Codeword we have three choices that provide sufficient flexibility. (The use of a large fixed-size Key Codeword is neither flexible nor efficient.)

(1) The Key Codeword is of variable size and its actual size is stored outside of the codeword.

(2) The Key Codeword is of variable size, and its actual size can be computed from the number of frames in the edd. This is a simple method where the V/IV data is given in an uncompressed bitmap. (See 4.3.4)

(3) The Key Codeword is of fixed size, but contains a flag that indicates an Extended Codeword of data. The Extended Codeword of data is likewise either of fixed size (with its own extension flag) or is of variable size with an early entry giving its size.

The first choice is the worst. The second choice allows a simple implementation. The third choice is the most efficient. The second and third choices are preferable to the first for the following two reasons.

(a) The Key Codeword must be protected by error correction, and for decoding we must know how large it is. If the size is variable, then it cannot be contained within the Key Codeword itself. Rather, it must be found in some other places, such as within the sync lattice. However, those bits may be useful for other functions, and an extra level of bootstrapping increases the probability of failure.

(b) If the size of the Key Codeword is either fixed or computable, then we do not waste any bits specifying its size.

The third choice, use of a small Key Codeword with options for extensions, is preferable to the second in that it is more flexible and compact. The Extended Codewords of the third choice can be of (1) fixed size, in which case they contain a flag that indicates if a subsequent Extended Codeword has been written, or (2) variable size, in which case the Key Codeword itself must give the size of the Extended Codeword.

The preferred implementation is probably the first, because this reduces the size of the Key Codeword.

In summary, the preferred implementation has a small Key Codeword of fixed size, with a flag for an Extended Codeword, which in turn is of fixed size and contains an extension flag that can indicate subsequent Extended Codewords.

Encoding of V/IV Units

There are several methods by which the V/IV information can be encoded in the Key Codeword. These are not exclusive; in particular, if the Key Codeword is expressed in a tagged language, then in any particular instance the most compressed form can be chosen. The granularity of the V/IV information can be frames (a preferred method for simplicity), or bytes, or some other rectangular tiling.

(1) A bitmap that contains one bit for each unit of granularity, and has values 1/0 indicating whether the unit is valid or invalid.

(2) A compressed encoding of the bitmap in (1); e.g., a run-length encoding.

(3) An enumerated list of bad rectangular regions, of which the following are examples:

(3a) A list of bad frames.

(3b) A list of multi-frame rectangular regions.

(3c) A list of arbitrary rectangular regions, that- do not necessarily fall on frame boundaries.

A special and simple case of (3) is a single multi-frame rectangular region. The first method has the property that the size of the bitmap can be computed from the size of the edd and the frames, both of which can be determined by the reader without using the Key Codeword.

Variant (3c) is the most general. It can be used efficiently with arbitrary foreground logo marks, because rather than marking entire frames as V/IV, it just marks the specific rectangular regions that are obscured by the logo. For example, (3c) can be used to put edd over a logo composed of lines of text.

Because of the desirability of byte folding and for ease of implementation, one can back away from the "arbitrary rectangular regions" of variant (3c), by adding the constraint that the rectangular regions must cover entire 8-bit symbols. These bytes of data can be folded (e.g., into 4×2 sets of glyphs) or not (e.g., written as 8×1 sets of glyphs).

An implementation of variant (3c)is given below, where a set of small op codes is used that results in an efficient encoding that has the flexibility to write glyphs around a (nearly) arbitrary foreground logo.

Other Uses for the Key Codeword

The Key Codeword can contain information in addition to the specification of V/IV frames. For example it can contain the number of bytes of data encoded, the encoding method (including for block codes the block size and the number of parity bytes in a block), and a version number. It can contain header information that precedes the user's data, including for example the method by which the data was compressed before encoding into the edd. It can also contain other information that is more closely related to the application, such as a digital signature, the date of origination, and pointers to associated data (e.g., filenames).

Thus, the Key Codeword stands as a "key" element of this bootstrap method, irrespective of whether or not there are even any invalid frames. For example, a glyph implementation can use a Key Codeword that contains some of the data mentioned above, but does not support invalid frames.

Replication of Data into Invalid (IV) Frames

The scanned image presented to the reader may differ greatly from the idealized image described by the writer. The printing process can distort the image by changing the size of image pixels and warping their placement on the paper. Transmission errors can occur over analog lines; e.g., in facsimile. The edd can be damaged while on paper by additional markings, dirt, tears and dimensional warping. The scanning process can distort the image because of defective scan elements, irregular paper motion, optical modulation transfer functions that smear pixels together, and arbitrary binary threshold settings. For these reasons, the system must be built to handle some nonzero fraction of errors in the readback process.

These "post-writer" distortions in the edd image must be distinguished from distortions introduced deliberately by the writer, in the form of logo (foreground markings) described earlier. When the writer determines that a sufficient number of glyphs within the frame will be obscured by logo, it marks that frame invalid. However, many individual glyphs in invalid frames may not be obscured by logo, and may in fact be readable. Glyphs put into invalid frames should therefore contain redundant information, to improve the reliability of the decoding process in the presence of "post-writer" damage to data in valid frames.

A simple use of invalid frames is to replicate valid frames. For this purpose, we can assign a "replication" order to the frames that is independent of the order in which glyphs fill the frames. [The order in which the glyphs fill the frames isn't discussed here. The glyph data and parity is scrambled in some fashion, and the result is "poured" into the valid frames in any desired order, with the only constraint that the bytes should be folded in 2×4 or 4×2]. Given the assigned replication order, after the valid frames are filled, the invalid frames can be filled with replicas of either the previous or the immediately following valid frames.

If the V/IV granularity is not by frame, but instead by some other amount(s), replication of valid bits within IV regions is still possible, but would be done based on the defined granularity. Even if the V/IV granularity varies over the edd, a simple method such as replicating an adjacent IV region is possible. As an example, consider a row of glyphs as composed of runlengths of V and IV glyphs. The values of the IV glyphs in a run of IV glyphs could be set by replicating the run of V glyphs to its immediate right. If the run of V glyphs is smaller than the run of IV glyphs, the replication in the IV run could repeat the V glyphs more than once.

Another use for invalid frames is to replicate the Key Codeword (as well as any Extended Codewords). This has an interesting result: the larger the fraction of invalid frames in an edd, the more robust the decoding of the Key Codeword! The Key Codeword can be replicated in non-dispersed fashion within invalid frames, or dispersed.

Example Proposal for Extensible Coding

For general extensibility, each property described in the Key Codeword or Extended Codeword can be tagged with a few bits (e.g., 4). For efficiency, we want to use as few bits for the tags as possible, but we also need enough bits to describe a sufficiently rich language for expressing the required meta information.

Two-bit tags are not sufficient; eight-bit tags are overkill. A reasonable engineering choice is to use 4 bits for the op codes. With four bits, sixteen different op codes can be defined. However, one of them can be used to extend the instruction set, by indicating a change to a new instruction set. This specific op code can then be followed by 4 bits indicating the number of the new instruction set. This mechanism provides 16 sets of 15 instructions each.

It should be emphasized that the use of procedural meta-data in the key codeword both increases the flexibility and reduces the amount of meta-data.

In this section, we give an example of one of these sets of 16 op codes, which is intended to express the locations of invalid glyphs procedurally in the Key Codeword (or the Extended Codeword). In the uniform case, where there are no bad locations, the procedure consists of a single EndOfProcedure opcode. All opcodes are expressed in a nibble and are followed immediately by their operands. The operand size is dependent on the opcode. There are no branching opcodes at all. Procedures are just sequences of nibbles accessed in linear order until an EndOfProcedure Opcode is found.

As will be evident, the granularity of the V/IV decisions can be specified by the encoding. These decisions can take place at the frame level, or higher at the multi-frame level, or down to a single 8-bit set of glyphs. The latter is useful if the logo is sufficiently distributed that there are no large (e.g., frame-sized) un-occluded regions of background into which glyphs can be written.

A parser is required to decode the meta-information. Before execution of this parser, all locations are considered good, and a default location and block granularity are Here is a set of 16 proposed 4-bit opcodes, given in hex notation, along with the sizes operands:

0 EndOfProcedure
1 SetCourseness: 8
2 MoveLocation: 8,8
3 MoveLocation: 6,6
4 MoveLocation: 4,4
5 Rectangle: 8,8
6 Rectangle: 6,6
7 Rectangle: 4,4
8 RunLength: 8,8, RLE bytes
9 RunLength: 6,6, RLE bytes
A RunLength: 4,4, RLE bytes
B BitMap: 8,8, bitmap bytes
C BitMap: 6,6, bitmap bytes
D Biap: 4,4, bitmap bytes
E FlipGoodBad
F Set New Instruction set:4

The parser that executes the procedure is simply passed a pointer to the first opcode in the procedure, a maximum size (used only for error detection), and a pointer to a bitmap containing one bit for each byte location in the edd. Here, the bitmap represents a rectangular array of locations occupied either by a valid data byte, or a logo-obstructed invalid byte.

The parser works as follows:

(1) Initialize globals:
All map bits=0
Courseness=0
X Location=0 (this could also initialize to the center, or somewhere off-center assuming a rectangular bad region)
Y Location=0
mapBadFlag=TRUE
endOfProcedureFlag=FALSE
abortFlag=FALSE (2) Until maxSize nibbles have been processed or endOfProcedureFlag or abortFlag set, loop on this:
Get next nibble value
Do Operation associated with the nibble value (3) If endOfrocedureflag
Return(TRUE)
Else
Return(FALSE) (inconsistent parameters found or reached end with no EndOfProcedure opcode)

The set of operations is:

0—End OfProcedure
Set the endOfProcedureFlag
Return

1—SetCourseness: 8

Get the next two nibbles and use as byte value. Index into table that says how many nibble folded bytes high and wide to consider as our unit of movement and unit of badness.

A value of 0 means each data byte position is considered individually. Here is a proposed encoding that tries to keep blocks as square as possible:

0—Each nibble folded byte is a block.

1—Each two nibble folded bytes stacked vertically are considered a block. If there are an odd number of blocks vertically, the last row of blocks will have only one byte per block.

2—Each two across and four down.

255—255 accross and 128 down.

When a SetCourseness opcode is executed the current block pointer is set to point to the block containing the first byte of the old block.

2—MoveLocation: 8,8

The next four nibbles specify the amout to move the current block pointer from its present location. The first 8 parameter bits are how much to move in the horizontal direction, and the next 8 bits specify the amount to move in the vertical direction. The parameters are always considered positive, but wrap back to the beginning of the same row or column. Units of movement used are those last set by the SetCourseness opcode, if any.

3,4—MoveLocation: 6,6 and 4,4

Same as for 2, but with different size parameters.

5,6,7—Rectangle: 8,8 and 6,6 and 4,4

The rectangle from the current location, and extending to the right and down, (with wrap) by the amount specified by the two parameters are marked as Bad if the mapBadFlag is TRUE, and as Good if the mapBadFlag is FALSE. If both parameters are zero then the entire EDB is marked accordingly.

8,9,A—RunLength: 8,8,RLE and 6,6,RLE and 4,4,RLE

The rectangle from the current location, and extending to the right and down, (with wrap) by the amount specified by the first two parameters are marked according to a variable length RLE sequence of counts. If mapBadFlag is FALSE, then the first count is the number of blocks in row major order in the rectangle that are to be marked as GOOD, and the next count is the number to be marked as bad, and so on until all blocks of the rectangle are marked. If the mapBadFlag is TRUE, then the first count specifies the number of blocks that are to be marked as BAD. The sequence of counts must specify the number of blocks in the rectangle exactly since filling the last block signifies the end of the RLE parameters, and the start of the next opcode.

The first nibble of the RLE specifies the size of the counts as follows:

0—4,4—Both even and odd indexes of counts are 4 bits wide.

1—4,8—The first count, and every other count from then on is 4 bits, while the second count is 8 bits wide along with the forth and sixth and so on.

2—8,4
3—8,8
4—16,8
5—8,16
6—16,16

This should be refined later.

If both of the first two parameters are 0, then the entire edd is encoded.

B,C,D—BitMap: 8,8, BitMap and 6,6, BitMap and 4,4, BitMap

The rectangle from the current location, and extending to the right and down, (with wrap) by the amount specified by the first two parameters are marked according to a sequence of bits stored in complete nibbles. If mapBadFlag is TRUE, then 1's in the BitMap (in row major order) cause the map bits for the corresponding block to be marked BAD, and the blocks corresponding to the zero locations to be marked as GOOD. If mapBadFlag is FALSE, then the blocks are marked in the opposite sense. The number of bits in the bitmap must match the number of blocks in the rectangle, except that the last nibble containing the BitMap is padded. with zero bits if necessary to fill out the nibble.

If both of the first two parameters are 0, then the entire edd is encoded.

E—FlipGoodBad

Reverse the state of the mapBadFlag.

F—SetNewInstructionSet: 4

Extensions to the instruction set can be defined as up to 15 sets of 15 instructions each. The F instruction of each set is used for changing to another set. For the interpreter, this just means changing the vector table used for dispatching the opcodes. The instruction set defined here is set number 0.

If the instruction set specified by the nibble following the opcode does not exist, then the entire instruction should be considered a NOP; this allows for future documents with extensions to be read using old interpreters without producing any error messages.

The other instruction sets can be used to specify such things as (1) other Good/Bad encoding schemes;

(2) the encoding of optional fields such as Format, Date of Creation, Creator, Keywords, and Versioning;

(3) encoding processing information, such as Send-by-Fax, or Send-to-Address;

(4) the type of header located at the beginning of the encoded user data;

(5) the compression method used with the user data.

Dispersal of the Key Codeword Throughout the Edd

A general solution to dispersing the Key Codeword throughout the entire edd using a psuedo-random sequence of locations is fairly complicated, and it is not evident that the extra safety of total dispersal warrants the added complexity of the implementation.

We can also disperse a fixed-size Key Codeword using the same pseudo-random sequence. Let the size of the Key Codeword, including its own parity, be N bytes. We divide the pseudo-random sequence of locations of the entire message, including the Key Codeword, into N consecutive segments, and use each segment to determine where to put the corresponding byte of the Key Codeword within the edd. The writer writes the byte of the Key Codeword into the first position within its set (segment) of possible locations that is not damaged by logo (e.g., not within an invalid frame).

For extra reliability, that byte is also written to EVERY invalid location within its segment that occurs prior to the first valid location. This puts the bytes within invalid regions to good use, and should significantly help in the reconstruction of the Key Codeword in situations where a large fraction of the regions (frames) are invalid.

One other point: the writer knows which regions are invalid, and hence knows when to stop writing a byte of the Key Codeword into each of the segments. But the reader has no such information a priori, since that information is contained within the Key Codeword (or its extension) itself. How can the reader know if a byte of Key Codeword is in a valid frame!

The reader can try to read the glyphs in each frame in advance. For frames where sufficient numbers of glyphs have a low signal, indicating damage, the reader can mark the frame as possibly invalid. Then when reading successive pseudo-random locations for each segment, where a byte of Key Codeword is supposed to be written, the reader can note the first byte that is NOT in a frame marked possibly invalid. It is likely that this is in fact the correct Key Codeword byte. Call it the "candidate byte". The reader should check prior bytes in that segment, some of which may be readable, for bit-wise correlation with the candidate byte. There are two possible situations:

(1) The prior bytes in that segment, that are within invalid frames, are either non-existent (i.e., the candidate byte is the first in the segment), unreadable, or are readable and correlate with the candidate byte. In this case there is no reason to believe that the candidate byte is incorrect, and it is chosen for that segment.

(2) The prior bytes exist and do not correlate well with the candidate byte. In this case, it is unlikely that the candidate byte is correct. Rather, one of the bytes prior to the candidate byte is most likely the correct one for that segment. Correlations within this earlier sequence of bytes can be searched for, and depending on the result the Key Codeword byte for that segment can either be guessed from these earlier bytes, or the byte can be marked as an "erasure" and handled by the parity for the Key Codeword.

The following is an example of an embodiment of this system.

(1) The Key Codeword is of variable size, and contains an uncompressed bitmap that labels each frame as V/IV.

(2) Because the Key Codeword has variable size, there is no use of Extended Codewords.

(3) Because the size of the Key Codeword is computable from the number of frames, its variable size does not need to be embedded within the sync lattice.

(4) For simplicity, the Key Codeword is pseudo-randomly distributed over the top row of frames.

(5) Glyphs in invalid frames replicate those in the previous valid frame, where the operational definition of "previous" is given by ordering the frames from left-to-right and top-to-bottom.

In the case where a series of data is to be printed in a series of frames, the frames can be numbered by information in the sync lattice or in the data bits to associate certain data with certain frames. In the case where a smaller amount of data is to be printed redundantly in a larger number of frames, the frames can be numbered by some numbering system modulo n so that the same data will be stored in a plurality of frames having the same number.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A process of printing glyph frames on media around an obstruction, where a frame is defined as an m by n area of data bits and one or more bordering sync lines, comprising:

deciding which frame locations are unobstructed when printed, printing in one unobstructed frame meta-data information about which locations are unobstructed, and printing the frames within the unobstructed locations, wherein a sync lattice comprising the sync lines of a number of frames in an area contains meta-data describing whether a frame is obstructed or unobstructed, wherein the unobstructed frames are numbered in the sync lattice, wherein the numbering is modulo a number that is smaller than the number of available frames.

2. The process of claim 1 comprising the step of also printing the information in obstructed frames to provide redundancy.

3. The process of claim 1 wherein the meta-data includes procedural data.

4. A process for printing embedded digital data in frames on media around an obstruction, where a frame is identified by at least one bordering sync line, comprising:

determining which frames in a set of frames are unobstructed when printed;

printing in a subset of unobstructed frames meta-data information about which frames in the set are unobstructed; and printing digital data bits in the remaining unobstructed frames;

wherein the meta-data information comprises a codeword of N bytes and wherein the codeword is dispersed according to the method:

defining a pseudo-random sequence of frame locations for the data bits;

dividing the pseudo-random sequence into N consecutive segments; and using each segment to determine a location to print a corresponding byte of the codeword.

5. The process of claim 4, further comprising:

replicating the data bits in the obstructed frames.

6. The process of claim 4, wherein a different portion of the meta-data information is printed in each frame of the subset of unobstructed frames.

7. The process of claim 4, further comprising:

replicating the meta-data information in the obstructed frames.

8. The process of claim 4, wherein the meta-data information is printed throughout all of the unobstructed frames.

9. The process of claim 4, wherein the meta-data information comprises information defining which frames are obstructed and which are unobstructed and information defining an encoding method for the embedded digital data.

* * * * *